United States Patent

Cannon et al.

[11] Patent Number: 5,974,447
[45] Date of Patent: Oct. 26, 1999

[54] METHOD AND SYSTEM FOR COUPLING A SELECTIVE CALL RECEIVER TO WIDELY DISTRIBUTED INFORMATION SOURCES

[75] Inventors: Gregory Lewis Cannon, Keller; David P. Kilp, Colleyville; Nick P. Lagen, Fort Worth, all of Tex.

[73] Assignee: Motorola, Inc., Schaumburg, Ill.

[21] Appl. No.: 08/682,483

[22] Filed: Jul. 17, 1996

[51] Int. Cl.⁶ .............................. G06F 13/38; G06F 15/17
[52] U.S. Cl. ...................... 709/206; 340/825.44; 370/313
[58] Field of Search .................. 395/200.36, 200.47, 395/200.37, 200.48, 200.57; 340/825.27, 825.44, 825.49; 370/313; 455/32.1; 709/206, 217, 207, 218, 227

[56] References Cited

U.S. PATENT DOCUMENTS

| | | |
|---|---|---|
| 5,239,466 | 8/1993 | Morgan et al. . |
| 5,475,863 | 12/1995 | Simpson et al. . |
| 5,487,100 | 1/1996 | Kane . |
| 5,530,438 | 6/1996 | Bickham et al. . |
| 5,530,852 | 6/1996 | Meske, Jr. et al. . |
| 5,537,546 | 7/1996 | Sauter . |
| 5,608,725 | 3/1997 | Grube et al. . |
| 5,635,918 | 6/1997 | Tett . |

*Primary Examiner*—Mark H. Rinehart
*Attorney, Agent, or Firm*—Pablo Meles; Charles W. Bethards

[57] ABSTRACT

A communication system (10) for coupling a selective call transceiver (18) to a widely distributed information source (24) comprises a server (22) coupled to the widely distributed information source. The server contains agents for retrieving information customized for a given selective call transceiver. The system further includes a paging terminal (20) coupled to the server for allowing the selective call transceiver to request information from the server. The system also includes a transmitter for transmitting the predetermined information retrieved from the widely distributed information source to the selective call transceiver.

17 Claims, 1 Drawing Sheet

METHOD AND SYSTEM FOR COUPLING A SELECTIVE CALL RECEIVER TO WIDELY DISTRIBUTED INFORMATION SOURCES

FIELD OF THE INVENTION

This invention relates in general to selective call transceivers in a two-way communication system and more specifically to retrieval of information from a widely distributed information source using a selective call transceiver.

BACKGROUND OF THE INVENTION

Retrieval of information from the internet via a wireless device is an emerging technology that will be soon be available or cellular phones using Cellular Digital Packet Data or CDPD. There is a de,sire to port some of this same technology to personal digital assistants and other wireless devices. A mobile user may want to access personal and updated information with the convenience of a low cost pager-sized device that uses store-and-forward technology rather than a cellular phone using real time transmissions. The information may exist on the world wide web, but a browser is not convenient, or the information may exist on proprietary information networks, and a modem is not Convenient or the memory or processing required at the wireless device would raise the cost of the wireless device. Thus, there exists a need for a low cost pager-like device that can request the services of a server to dispatch an agent to obtain information for the pager-like device and return the information in store-and-forward system that takes advantage of low cost non-real time transmissions.

SUMMARY OF THE INVENTION

In a first aspect of the present invention, method for coupling a selective call transceiver to a widely distributed information source comprises the steps of operatively coupling a server to the widely distributed information source, wherein the server contains agents for retrieving information customized for a given selective all transceiver and originating a request for information at the selective call transceiver to the server and retrieving the information from the widely distributed information source using the agents in the server.

In a second aspect of the present invention a communication system for coupling a selective call transceiver to a widely distributed information source comprises a server coupled to the widely distributed information source, wherein the server contains agents for retrieving predetermined information customized for a given selective call transceiver and a communication terminal coupled to the server for allowing the selective call transceiver to request for predetermined information from the server.

In a third aspect of the present invention, a selective call transceiver capable of requesting information from a widely distributed information source coupled to a server comprises a selective call receiver coupled to a decoder and a controller, a selective call transmitter coupled to the controller and an encoder, and a memory coupled to the controller capable of dynamically changing protocol entity definitions in a synchronized manner with the server, wherein the server distributes agents on the selective call transceiver's behalf for retrieving information from the widely distributed information source for transmission back to the selective call transceiver.

In a fourth aspect of the present invention, a server for retrieving user selected information from a widely distributed information source using a selective call transceiver comprises a memory location for mapping user selectable inputs from the selective call transceiver and inputs from the communication system with tokens, a translator for translating the tokens at the server into retrieval commands for retrieving information from the widely distributed information source, and a formatter for formatting the retrieved information in a format suitable for reception at a device selected by a user of the selective call transceiver.

DETAILED DESCRIPTION

Figure 1:
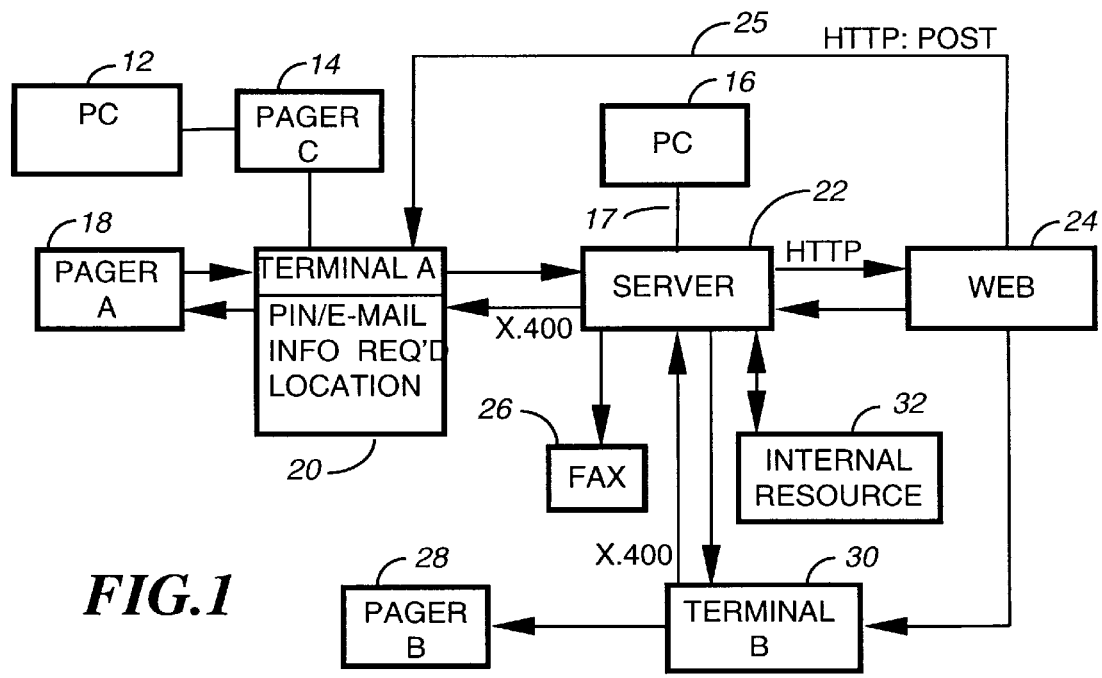
FIG. 1 is a system block diagram of a communication system in accordance with the present invention.

Referring to FIG. 1, a communication system 10 for operatively coupling a selective call transceiver 18 to a widely distributed information source 24 is shown. More particularly, the communication system 10 preferably comprises a server 22 coupled to the widely distributed information source 24, wherein the server contains agents for retrieving information customized for a given selective call transceiver. The selective call transceiver 18 is preferably operatively coupled to the widely distributed information source 24 via a terminal 20 such as Motorola's Wireless Messaging Gateway paging terminal. Operationally, the paging terminal or terminal 20 allows the selective call transceiver 18 to request information from the server 22. A transmitter (not shown) preferably coupled to the terminal 20 transmits the information retrieved from the widely distributed information source to the selective call transceiver 18. Alternatively, the selective call transceiver 18 can request the information to be forward to any number of devices such as the facsimile machine 28 or paging terminal 30.

Internet access via a two-way selective call transceiver or pager lends itself to numerous applications. Perhaps the most important would be geographically based retrieval. Certain information requested can be retrieved based on the user location as determined by the communication system 10. More specifically, a two-way paging system having a plurality of base receivers can narrow down the location of the transmitting selective call receiver as is known in the art. Thus, with location information inherent to the communication system, local information such as weather reports, traffic conditions, etc. can be sent without the user having to specify a location.

Another feature in accordance with the present invention is the ability to dynamic parse and customize information that would be delivered to a user. The information can be selected from different sources and/or formatted to account for time variable information that may need to be formatted in different ways based on system constraints such as channel capacity or user selected constraints such as cost. For instance, stock information may be available from various sources such as different web pages, each having various levels of detail and possibly graphics. The system software that resides in the server 22 will know the capabilities of the particular selective call transceiver requesting information and may even have a user profile as to the level of information desired. Based on this information, the system 10 can retrieve information from any of the available sources. The system preferably uses anchors, combinations of documentation translation utilities, and configurable text strippers to maintain as much information as possible while eliminating as much fluff as possible. Additionally, the user can set preferences for retrieval of information web based on device size, fragmentation length, security algorithms or keys, or other parameters. Users could even set up preferences for information delivery based on personal choice and taste. Also, since much of the available information on the internet or a distributed in formation system is redundant and the present invention is able to map these sources, if the agent has a problem with one repository, tie agent can try others in a user configurable preference order, all with dynamic parsers.

Other user preferences that can be set could include an auto searcher of information that meets a particular criteria. The agent server could periodically scan 'hot lists' published by information publishers to determine if content is suitable for service by agents. Protocols would be updated to make the new services available, and mechanisms would exists to allow users of agents to learn about the existence and names of new services automatically. A user's preferences may exists such that if the length of a message or format is unsuitable to the delivery medium (due to security, privacy, cost, or capacity) then the agent would automatically forward to another mutually agreed destination or medium. A user may also set tolerance levels for time delays for delivery of information if acceptable for cost or capacity considerations. For instance a user may not mind delivery of particular information in the middle of the night if the cost is lower and the information is not time critical.

Another feature in accordance with the present invention is user controlled message routing. As previously mentioned, a user of a selective call transceiver using this information retrieval system typically wants the agent in the server to deliver the information back to the user, using the same channels that the user used to get to the agent. On occasion, the user may want to deliver specific information to someone or something else. Thus, a company's web page explaining product prices could be transmitted to a prospective client to their given facsimile number or electronically mailed to a particular electronic mail account.

Another beneficial feature of the present invention that particularly assists in reducing the amount of information sent inbound to a paging terminal and saves the user from entering additional information is intelligent query handling based on session context. The agent in the server will keep a state machine of user requests for a given session. The agent will then respond to command, in a context sensitive manner, thus allowing the commands to have many more meanings in a sequential context. For example, if business financials are asked for a particular company, and the next query in news, instead of sending all of the news, the agent could gather just the news about the current company the agent was already finding things about. Of course, this capability is preferably user configurable as well as overridden if desired. Again, this feature diminishes parameters being sent over the air and thus increases capacity. In another related aspect of the present invention, each session could be dynamically encoded depending upon the information resource the selective call receiver is retrieving information from. In other words, instead of having static lists for what canned codes mean on forward or reverse channels, the codes change meaning depending on where the user is in the session. There would preferably be a high level protocol that would synchronize these codes.

The system 10 can preferably keep statistics on particular users, identify certain users as high profile or power users, and make decisions to follow or learn about that user's behavior. The system may even setup an auto monitor that follows agent request usage patterns. The server 22 could then automatically suggest the use of these monitors to the user. Furthermore, the system could reconfigure the user's device to use a more individual protocol to reduce the airtime that the user uses to communicate to the agent, and vice-versa. This could give a great deal of channel capacity.

Preferably the server 22 can be modified to customize or optimize operations, maintenance, and testing of the system 10. Administrators of the agent server 22 can query the status of agents and server resources and remotely enable or disable users, agents and/or services. The administrators can do this either through administration agents or through any other server entry point such as a personal computer 16 couple to the server 22 via link 17.

As paging technology progresses towards the world of multimedia, there will be time when a selective call receiver can receive not only text, but graphics as well as sound in one portable unit. A server in accordance with the present invention will eventually need the capability to split the available retrievable information on the basis of text, graphics and sound. Some of this technology on the portable subscriber side is beginning to emerge with Motorola's TENOR™ voice messaging unit using Motorola's InFLEXion™ Voice over-the-air protocol. Thus, if a particular TENOR™ subscriber unit only had voice capability and the source of information was only available in text, the agent at the server would include a text to speech converter or translator a lowing for audible "viewing" of the text. Likewise, if a graphical image had text within the image, and the subscriber unit requesting information only had the capability to see text, then the agent at the server could include a system for optical character recognition and convert the image to text. As another example, if the information available on the web was digitized video, and the subscriber unit only had limited memory, and graphics display capability, then the video could be selectively displayed as a series of graphic illustrations based on device display capability and other considerations.

In another aspect of the present invention, the use of multiple choice responses can be effectively used to simulate an interactive web browser such that information links identified by the server can be mapped into dynamic prompted responses for the user. This allows substantial reduction in the bandwidth required for the user to select specific information that the user desires.

Another aspect of the present invention would allow for user sessions. In other words, the server would allow users to access gateways that allow communication between different medium such as telephone, fax, or even other paging gateways or terminals from different carriers which might operate using different wireless protocols. For example, pager A (18) requests access to the resources (in this instance a computer 12 coupled selective call transceiver 14) of pager C (14). The user of pager C grants access to their resources to user A through the server 22. Pager A is notified and accesses pager C and then stops access. Pager A and C can then set up a session to set up parameters between them such as security algorithms or keys and, compression ratios without the server 22. The sessions could be set up between pagers on different paging networks, for instance between pager A (18) communicating with terminal A (20) and pager B (28) communicating with terminal B (30).

Operationally, the present invention comprises a method for coupling a selective call transceiver 18 to a widely distributed information source 24. A server 22 is operatively coupled to the widely distributed information source, preferably using a an http post protocol wherein the server contains agents for retrieving information customized for a given selective call transceiver. A request for information is originated at the selective call transceiver to the server via a paging terminal 20 operatively coupled to the server. Information can be routed back and forth between the server and the paging terminal using a e-mail protocol such as x.400 or back and forth between the server and the paging terminal via the internet or web using the http post protocol. In any event, the information is then retrieved from the widely distributed information source using the agents in the server. The widely distributed information source can be the world wide web, also known as the "web". The information is then transmitted to the selective call transceiver. Ideally, location information for the selective call transceiver is obtained by receiving transmissions from the selective call transceiver at at least one of a plurality of base receivers (not shown) and providing the location information to the agents to further customize the predetermined information being retrieved. Preferably, the information is dynamically parsed in a format configured for a particular selective call transceiver user. Additionally, the selective call transceiver can direct the retrieved information to second communication device such as a facsimile machine 26, an computer 12 having an electronic mail account, a pager 28, or a cellular phone (not shown). Finally, the method of the present invention may further comprise keeping a state machine of the transceiver user requests, allowing the agent to respond to commands in a context sensitive manner.

In other words, the present invention dynamically changes protocol entities in a synchronized manner between the selective call transceiver and the server and preferably receives the entities at a dedicated server that distributes agents on the selective call transceiver's behalf to find information on the widely distributed information source. The protocol entities can be viewed as command sets or canned messages with mapped meanings. Preferably, the protocol between the dedicate[]d server and the agent is modified to optimize the cost of communication over the air. The agents can be directed to provided varying levels of information detail based on cost and capacity constraints.

In other terms, a method for retrieving user selected information from a widely distributed information source using a selective call transceiver in a communication system preferably comprises the steps of mapping user selectable inputs from the selective call transceiver and inputs from the communication system with tokens at a remote server in communication with the selective call transceiver and translating the tokens at the remote server into retrieval commands for retrieving information from the widely distributed information source. The method may also comprise the step of retrieving the information from the widely distributed information source and formatting the information in a format suitable for reception at the selective call receiver or alternatively formatting the information in a format suitable for reception at a device selected by user of the selective call transceiver.

Figure 2:
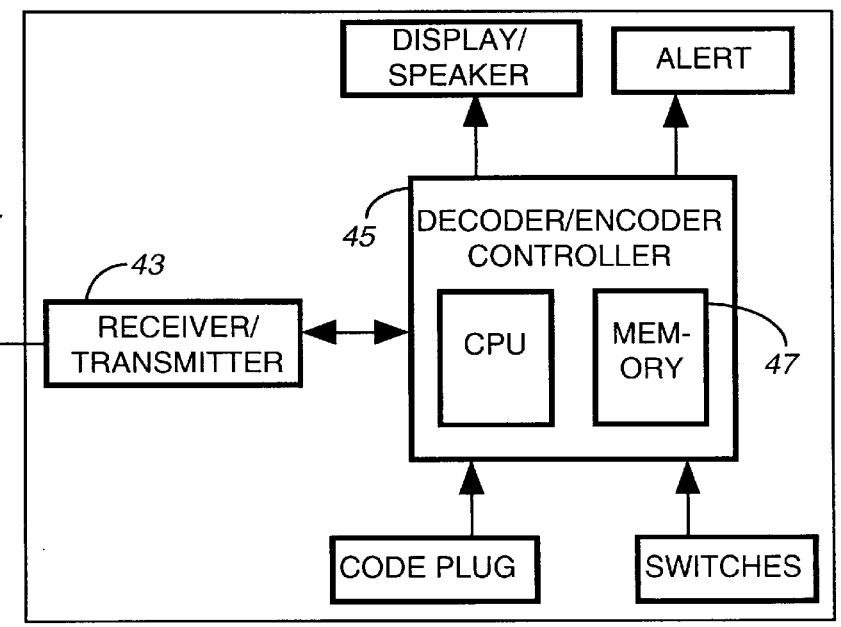
FIG. 2 is a block diagram of a selective call transceiver in accordance with the present invention.

A selective call transceiver 40 in accordance with the present invention as depicted FIG. 2 would preferably comprise a selective call receiver 43 coupled to a decoder 45 and a controller 45, a selective call transmitter 43 coupled to the controller 45 and an encoder 45, a memory 47 coupled to the controller capable of dynamically changing protocol entity definitions in a synchronized manner with the dedicated server, wherein the dedicated server distributes agents on the selective call transceiver's behalf for retrieving information from the widely distributed information source for transmission back to the selective call transceiver.

A server for retrieving user selected information from a widely distributed information source using a selective call for requesting information wirelessly from the server preferably comprises a memory location for mapping user selectable inputs from the selective call transceiver and inputs from the communication system with tokens, a translator for translating the tokens at the server into retrieval commands for retrieving information from the widely distributed information source, and a formatter for formatting the retrieved information in a format suitable for reception at a device selected by a user of the selective call transceiver. The user selectable inputs can be a inputs that assist in screening information based on content, cost to the user, or system constraints. Ideally, inputs from the communication system automatically include all the constraints associated with capacity, location, and possibly user profiles that are retained or observed by the system. For instance, such user profiles can contain the particular limitations of the selective call transceiver used by the user (whether it has sufficient memory, handles voice, text only, graphics only, or any combination of the preceding), or the usage patterns of the user based on location (viewing New York Times when in New York and the Miami Herald when in South Florida). In any event, the server would be able to handle much of the processing since the selective call transceiver is preferably a two-way pager using a communication system that is a non-real-time store-and-forward paging system.

What is claimed is:

1. A method for coupling a selective call transceiver to a widely distributed information source, comprising the steps of:

operatively coupling a server to the widely distributed information source, wherein the server contains agents for retrieving information from the widely distributed information source that is customized for a given selective call transceiver;

originating, at a communication terminal operatively coupled to the server, a request of the server for such information to be provided to the selective call transceiver; and retrieving the information from the widely distributed information source using the agents in the server.

2. The method of claim 1, wherein the method further comprises the step of transmitting the retrieved information to the selective call transceiver.

3. The method claim 1, wherein the method further comprises the step of obtaining location information for the selective call transceiver by receiving transmissions from the selective call transceiver at at least one of a plurality of base receivers and providing the location information to the agents to further customize the predetermined information being retrieved.

4. The method of claim 1, wherein the method further comprises the step of dynamically parsing the retrieved information in a format configured for a particular selective call transceiver user.

5. The method of claim 1, wherein the method further allows the selective call transceiver to direct the retrieved information to a second communication device, wherein the second communication device is selected from the group consisting of a facsimile machines, a computer having an electronic mail account, a pager, and a cellular phone.

6. The method of claim 1, wherein the method further comprises the step of keeping a state machine of the transceiver user requests allowing the agent to respond to commands in a context sensitive manner.

7. Method for coupling between a selective call transceiver to a widely distributed information source, comprising the steps of:
- dynamically changing protocol entities in a synchronized manner within the selective call transceiver;
- receiving the entities at a dedicated server that distributes agents on the selective call transceiver's behalf to find information on the widely distributed information source; and
- modifying a protocol between the dedicated server and the agent to optimize the cost of communication over the air.

8. A communication system for coupling a selective call transceiver to a widely distributed information source, comprises:
- a server coupled to the widely distributed information source, wherein the server contains agents for retrieving predetermined information customized for a given selective call transceiver;
- a paging terminal coupled to the server for allowing the selective call transceiver to request such predetermined information from the server; and
- a transmitter for transmitting the predetermined information retrieved from the widely distributed information source to the selective call transceiver.

9. A communication system for seamless coupling between a selective call transceiver and a widely distributed information source, comprises:
- a selective call transceiver that dynamically changes protocol entities in a synchronized manner; and
- a selective call terminal coupled to a dedicated server for receiving the protocol entities, wherein the dedicated server distributes agents on the selective call transceiver's behalf to find information on the widely distributed information source.

10. A selective call transceiver capable of requesting information from a widely distributed information source coupled to a server, comprises;
- a selective call receiver coupled to a decoder and a controller;
- a selective call transmitter coupled to the controller and an encoder;
- a memory coupled to the controller capable of dynamically changing protocol entity definitions in a synchronized manner with the server, wherein the server distributes agents on the selective transceiver's behalf for retrieving information from the widely distributed information source for transmission back to the selective call transceiver.

11. A server for retrieving user selected information from a widely distributed information source using a selective call transceiver in a communication system for requesting information wirelessly from the server, the server comprising:
- a memory location for mapping user selectable inputs from the selective call transceiver and inputs from the communication system with tokens;
- a translator for translating the tokens at the server into retrieval commands for retrieving information from the widely distributed information source; and
- a formatter for formatting the retrieved information in a format suitable for reception at a device selected by a user of the selective call transceiver.

12. The server of claim 11, wherein the selective call transceiver is a two-way pager and the communication system is a non-real time store and forward paging system.

13. The server of claim 11, wherein the user selectable inputs include information content preferences and cost preferences.

14. The server of claim 11, wherein the inputs from the communication system includes selective call receiver location information.

15. A method for retrieving user selected information from a widely distributed information source using a selective call transceiver in a communication system, comprising the steps of:
- mapping user selectable inputs from the selective call transceiver and inputs from the communication system with tokens at a remote server in communication with the selective call transceiver; and
- translating the tokens at the remote server into retrieval commands for retrieving information from the widely distributed information source.

16. The method of claim 15, wherein the step further comprises the step of retrieving the information from the widely distributed information source and formatting the information in a format suitable for reception at the selective call receiver.

17. The method of claim 15, wherein the step further comprises the step of retrieving the information from the widely distributed information source and formatting the information in a format suitable for reception at a device selected by user of the selective call transceiver.

* * * * *

(12) EX PARTE REEXAMINATION CERTIFICATE (7403rd)

United States Patent
Cannon et al.

(10) Number: US 5,974,447 C1
(45) Certificate Issued: Mar. 16, 2010

(54) METHOD AND SYSTEM FOR COUPLING A SELECTIVE CALL RECEIVER TO WIDELY DISTRIBUTED INFORMATION SOURCES

(75) Inventors: Gregory Lewis Cannon, Keller, TX (US); David P. Kilp, Colleyville, TX (US); Nick P. Lagen, Fort Worth, TX (US)

(73) Assignee: Motorola, Inc., Schaumburg, IL (US)

Reexamination Request:
No. 90/010,281, Sep. 16, 2008

Reexamination Certificate for:
Patent No.: 5,974,447
Issued: Oct. 26, 1999
Appl. No.: 08/682,483
Filed: Jul. 17, 1996

(51) Int. Cl.
*G08B 5/22* (2006.01)
*G06F 17/30* (2006.01)

(52) U.S. Cl. .............. 709/206; 340/7.21; 340/7.29; 340/7.48; 370/313; 707/E17.11

(58) Field of Classification Search .............. None
See application file for complete search history.

(56) References Cited

U.S. PATENT DOCUMENTS

| | | | |
|---|---|---|---|
| 4,819,174 A | 4/1989 | Furuno et al. | |
| 5,223,844 A | 6/1993 | Mansell et al. | |
| 5,623,656 A | 4/1997 | Lyons | |
| 5,802,465 A | 9/1998 | Hamalainen et al. | |
| 6,047,327 A | 4/2000 | Tso et al. | 709/232 |
| 6,457,007 B1 | 9/2002 | Kikuchi et al. | |

FOREIGN PATENT DOCUMENTS

| | | |
|---|---|---|
| CA | 2140805 A1 | 8/1995 |
| CA | 2189515 A1 | 7/1997 |
| CA | 2192545 C | 12/2000 |
| EP | 0647076 A1 | 10/1994 |
| JP | 5-274369 A | 10/1993 |
| JP | 06161918 A | 6/1994 |
| JP | 07065031 A | 3/1995 |
| JP | 07073085 A | 3/1995 |
| JP | 7-98669 A | 4/1995 |
| JP | 7170579 A | 7/1995 |
| JP | 8009053 A | 1/1996 |
| JP | 8098247 A | 4/1996 |
| WO | 199408403 A1 | 4/1994 |
| WO | 199603702 A1 | 2/1996 |

OTHER PUBLICATIONS

"GloMop: Global Mobile Computing By Proxy." (Sep. 13, 1995).
Hokimoto et al., An Approach for Constructing Mobile Applications Using Service Proxies; Japan Advanced Institute of Science and Technology; May 27, 1996; p. 726–733; Ishikawa, Japan; XP000640224.
Liljeberg et al., Optimizing World–Wide Web for Weakly Connected Mobile Workstations: An Indirect Approach; Department of Computer Science, University of Helsinki; p. 132–139; Finland; XP000764774.
GloMop Group; GloMop; Global Mobile Computing By Proxy; Berkely, CA; Sep. 13, 1995; p. 1–12; XP002094009.

*Primary Examiner*—Alexander J Kosowski

(57) ABSTRACT

A communication system (10) for coupling a selective call transceiver (18) to a widely distributed information source (24) comprises a server (22) coupled to the widely distributed information source. The server contains agents for retrieving information customized for a given selective call transceiver. The system further includes a paging terminal (20) coupled to the server for allowing the selective call transceiver to request information from the server. The system also includes a transmitter for transmitting the predetermined information retrieved from the widely distributed information source to the selective call transceiver.

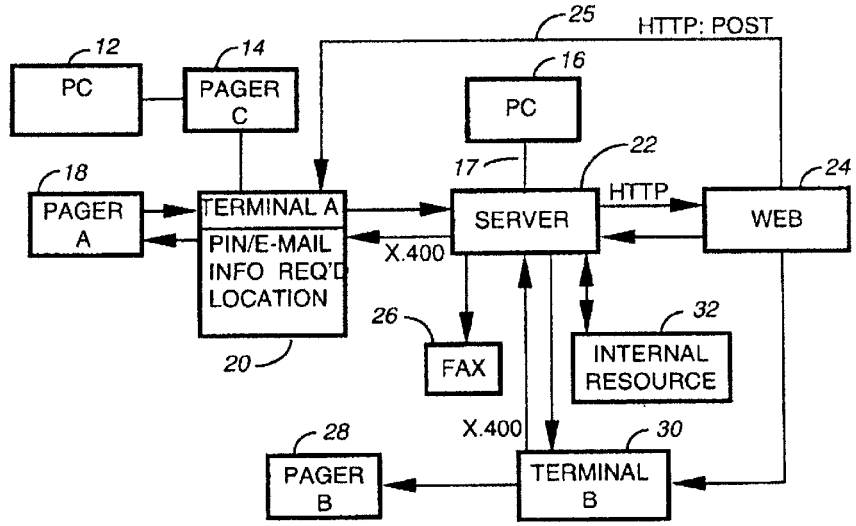

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claim 8 is determined to be patentable as amended.

Claims 1–7 and 9–17 were not reexamined.

8. A communication system for coupling a selective call transceiver to a widely distributed information source, comprises:

a server coupled to the widely distributed information source, wherein the server contains agents for retrieving predetermined information customized [for] *according to identified capabilities of* a [given] *requesting* selective call transceiver;

a paging terminal coupled to the server for allowing the selective call transceiver to request such predetermined information from the server; and a transmitter for transmitting the predetermined information retrieved from the widely distributed information source to the selective call transceiver.

* * * * *

(12) EX PARTE REEXAMINATION CERTIFICATE (9561st)
United States Patent
Cannon et al.

(10) Number: US 5,974,447 C2
(45) Certificate Issued: Mar. 13, 2013

(54) METHOD AND SYSTEM FOR COUPLING A SELECTIVE CALL RECEIVER TO WIDELY DISTRIBUTED INFORMATION SOURCES

(75) Inventors: Gregory Lewis Cannon, Keller, TX (US); David P. Kilp, Colleyville, TX (US); Nick P. Lagen, Fort Worth, TX (US)

(73) Assignee: Motorola, Inc., Schaumburg, IL (US)

Reexamination Request:
No. 90/010,888, Mar. 5, 2010

Reexamination Certificate for:
Patent No.: 5,974,447
Issued: Oct. 26, 1999
Appl. No.: 08/682,483
Filed: Jul. 17, 1996

Reexamination Certificate C1 5,974,447 issued Mar. 16, 2010

(51) Int. Cl.
*G08B 5/22* (2006.01)
*G06F 17/30* (2006.01)
(52) U.S. Cl. ..... 709/206; 340/7.21; 340/7.29; 340/7.48; 370/313; 707/E17.11

(58) Field of Classification Search .................. None
See application file for complete search history.

(56) References Cited

To view the complete listing of prior art documents cited during the proceeding for Reexamination Control Number 90/010,888, please refer to the USPTO's public Patent Application Information Retrieval (PAIR) system under the Display References tab.

*Primary Examiner* — Joseph R. Pokrzywa

(57) ABSTRACT

A communication system (10) for coupling a selective call transceiver (18) to a widely distributed information source (24) comprises a server (22) coupled to the widely distributed information source. The server contains agents for retrieving information customized for a given selective call transceiver. The system further includes a paging terminal (20) coupled to the server for allowing the selective call transceiver to request information from the server. The system also includes a transmitter for transmitting the predetermined information retrieved from the widely distributed information source to the selective call transceiver.

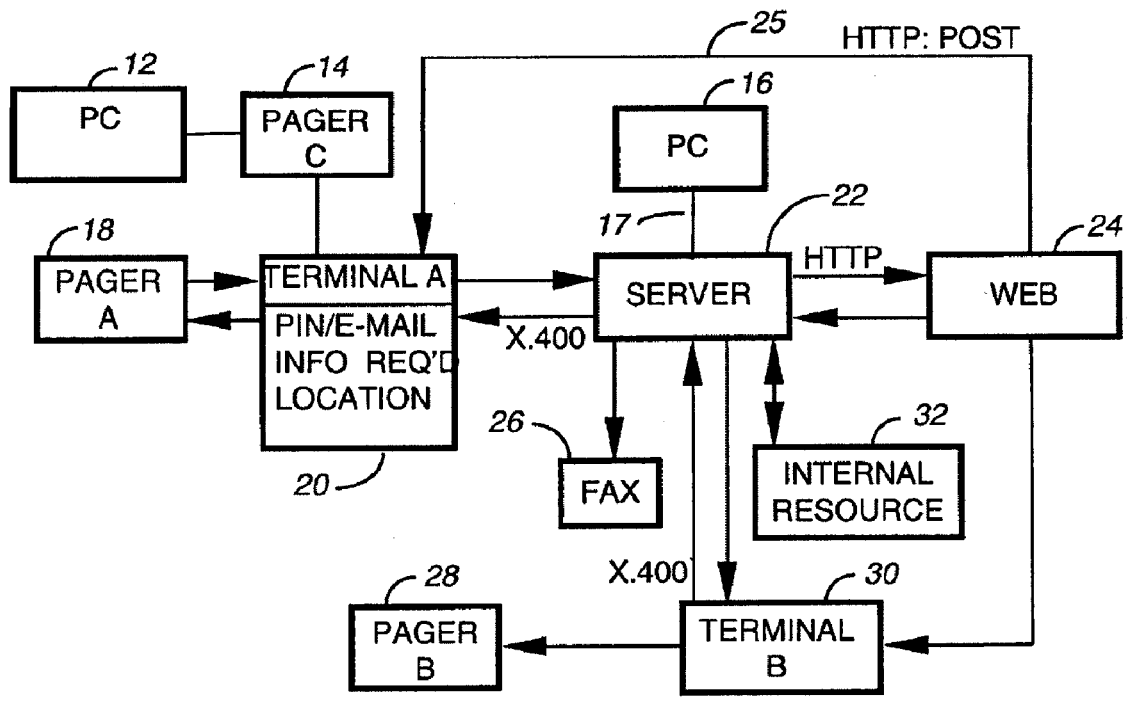

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1 and 8 are cancelled.

Claims 2-7 and 9-17 were not reexamined.

\* \* \* \* \*